US012598173B2

(12) United States Patent
Lin et al.

(10) Patent No.: US 12,598,173 B2
(45) Date of Patent: Apr. 7, 2026

(54) CERTIFICATE MONITOR SERVICE RELIABILITY DETECTION METHOD FOR PKI CERTIFICATE TRANSPARENCY SYSTEM

(71) Applicant: University of Science and Technology of China, Anhui (CN)

(72) Inventors: Jingqiang Lin, Hefei (CN); Bingyu Li, Beijing (CN); Aozhuo Sun, Beijing (CN); Shushang Wen, Anhui (CN); Dong Li, Beijing (CN); Yunhao Jia, Anhui (CN)

(73) Assignee: University of Science and Technology of China, Anhui (CN)

( * ) Notice: Subject to any disclaimer, the term of this patent is extended or adjusted under 35 U.S.C. 154(b) by 0 days.

(21) Appl. No.: 18/693,067

(22) PCT Filed: Apr. 14, 2023

(86) PCT No.: PCT/CN2023/088373
§ 371 (c)(1),
(2) Date: Mar. 18, 2024

(87) PCT Pub. No.: WO2024/212214
PCT Pub. Date: Oct. 17, 2024

(65) Prior Publication Data
US 2024/0406164 A1 Dec. 5, 2024

(51) Int. Cl.
*H04L 9/32* (2006.01)
*H04L 9/08* (2006.01)
*H04L 9/40* (2022.01)

(52) U.S. Cl.
CPC ........ *H04L 63/0823* (2013.01); *H04L 9/0825* (2013.01)

(58) Field of Classification Search
None
See application file for complete search history.

(56) References Cited

U.S. PATENT DOCUMENTS

| | | | |
|---|---|---|---|
| 2008/0187119 A1 | 8/2008 | Vinokurov et al. | |
| 2014/0283054 A1* | 9/2014 | Janjua ................. | H04L 63/1408 726/23 |

(Continued)

FOREIGN PATENT DOCUMENTS

| | | |
|---|---|---|
| CN | 106972931 A | 7/2017 |
| CN | 114070569 A | 2/2022 |

(Continued)

OTHER PUBLICATIONS

Li et al âThe invisible side of certificate Transparency: exploring the reliability of Monitors in the Wild , vol. 30, No. 2, April (Year: 2022).*

(Continued)

*Primary Examiner* — Fatoumata Traore
(74) *Attorney, Agent, or Firm* — Haynes and Boone, LLP.

(57) ABSTRACT

Disclosed is a reliability detection method for a certificate monitor service in a PKI certificate transparency system, including: sending a to-be-queried domain name set to one or more third-party certificate monitor service providers, and processing collected raw certificates output by the provider to obtain a certificate search result set; filtering and aggregating the certificate search result set to obtain a certificate reference set, detecting a difference between the certificate search result set and the certificate reference set; issuing reliability alert to the provider when a missing certificate and/or an irrelevant certificate in the certificate search result set; extracting features from a filtering result and a detecting result by using a feature extraction tool, analyzing the extracted features, generating a table of fault causes based (Continued)

A randomly generated set of to-be-queried domain names is sent to a plurality of third-party certificate monitor service providers, and collected raw certificates output by the plurality of third-party certificate monitor service providers are processed to obtain a plurality of certificate search result sets — S110

The plurality of certificate search result sets are filtered and aggregated to obtain a certificate reference set, a difference between each certificate search result set and the certificate reference set is detected; and a reliability alert is issued to the third-party certificate monitor service provider in a case that there is an irrelevant certificate and/or a missing certificate in the certificate search result set — S120

Features are extracted from a result of the filtering and a result of the detecting the difference by using a feature extraction tool, the extracted features are analyzed, a table of fault causes each of which induces a fault of the third-party certificate monitor service provider is generated based on a result of the analyzing, and the fault of the third-party certificate monitor service provider is located according to the result of the filtering, the result of the detecting the difference, and the table of fault causes — S130 on an analyzing result, and locating a fault of the provider according to the filtering result, the detecting result, and the table of fault causes.

9 Claims, 5 Drawing Sheets

(56)                    References Cited

U.S. PATENT DOCUMENTS

2022/0210147 A1      6/2022  Galvin et al.
2023/0412396 A1 *  12/2023  Bommisetty  ......... H04L 9/3073

FOREIGN PATENT DOCUMENTS

CN            114401143  A      4/2022
CN            114422138  A      4/2022

OTHER PUBLICATIONS

Laurie et al, Certificate Transparency, Internet Engineering Task Force (IETF), Request for Comments: 6962, Jun. 2013, ISSN: 2070-1721, pp. 1-27.
Li et al., "Certificate Transparency in the Wild: Exploring the Reliability of Monitors", 2019 ACM SIGSAC Conference on Computer and Communications Security (CCS'19), Nov. 11-15, 2019, London, United Kingdom. ACM, New York, NY, USA, 16 pages.
Sun et al., "Certificate Transparency Revisited: The Public Inspections on Third-party Monitors", Network and Distributed System Security (NDSS) Symposium Feb. 26, 2024-Mar. 1, 2024, San Diego, CA, USA ISBN 1-891562-93-2, pp. 1-20.

* cited by examiner

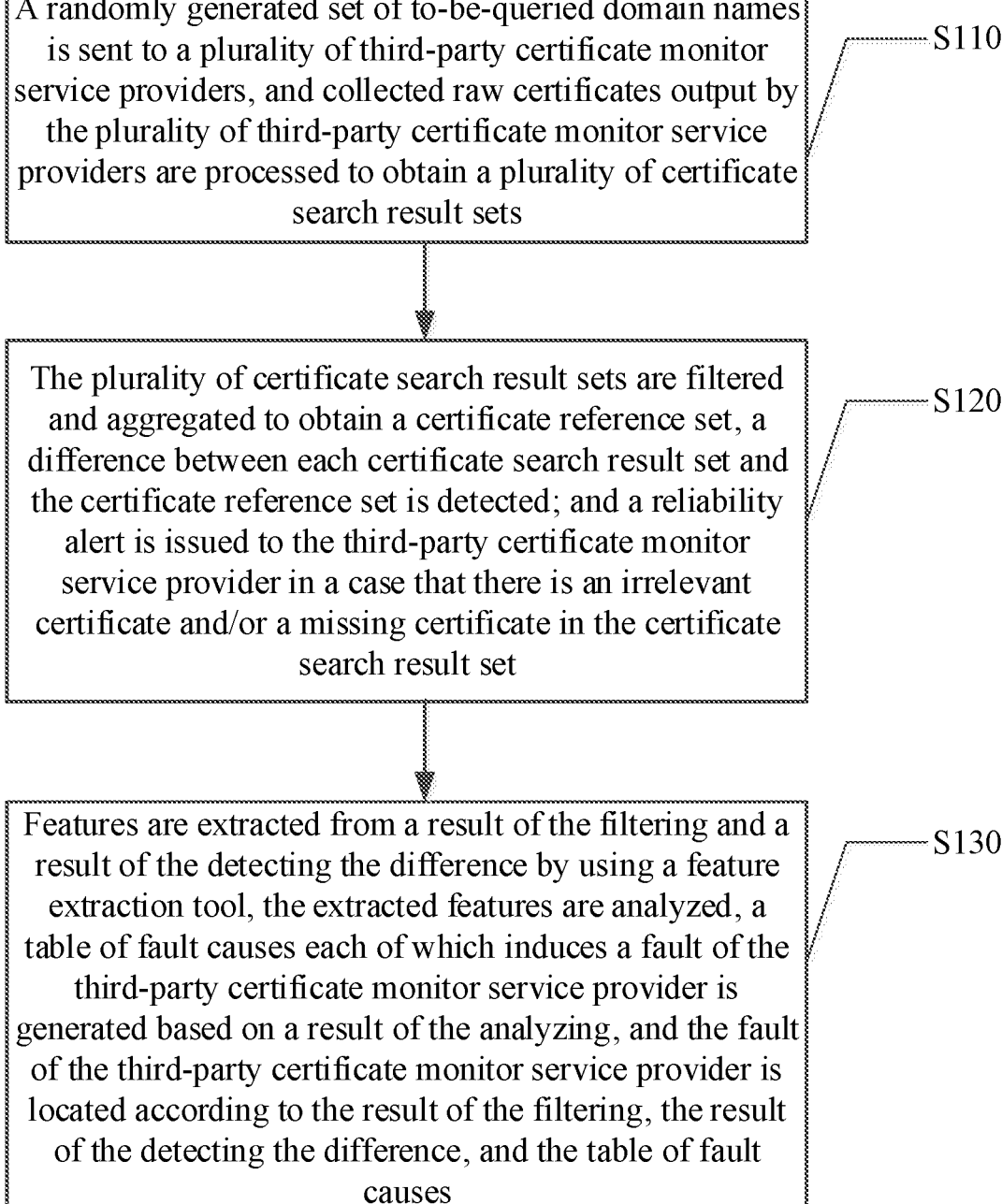

A randomly generated set of to-be-queried domain names is sent to a plurality of third-party certificate monitor service providers, and collected raw certificates output by the plurality of third-party certificate monitor service providers are processed to obtain a plurality of certificate search result sets ——S110

The plurality of certificate search result sets are filtered and aggregated to obtain a certificate reference set, a difference between each certificate search result set and the certificate reference set is detected; and a reliability alert is issued to the third-party certificate monitor service provider in a case that there is an irrelevant certificate and/or a missing certificate in the certificate search result set ——S120

Features are extracted from a result of the filtering and a result of the detecting the difference by using a feature extraction tool, the extracted features are analyzed, a table of fault causes each of which induces a fault of the third-party certificate monitor service provider is generated based on a result of the analyzing, and the fault of the third-party certificate monitor service provider is located according to the result of the filtering, the result of the detecting the difference, and the table of fault causes ——S130

FIG. 1

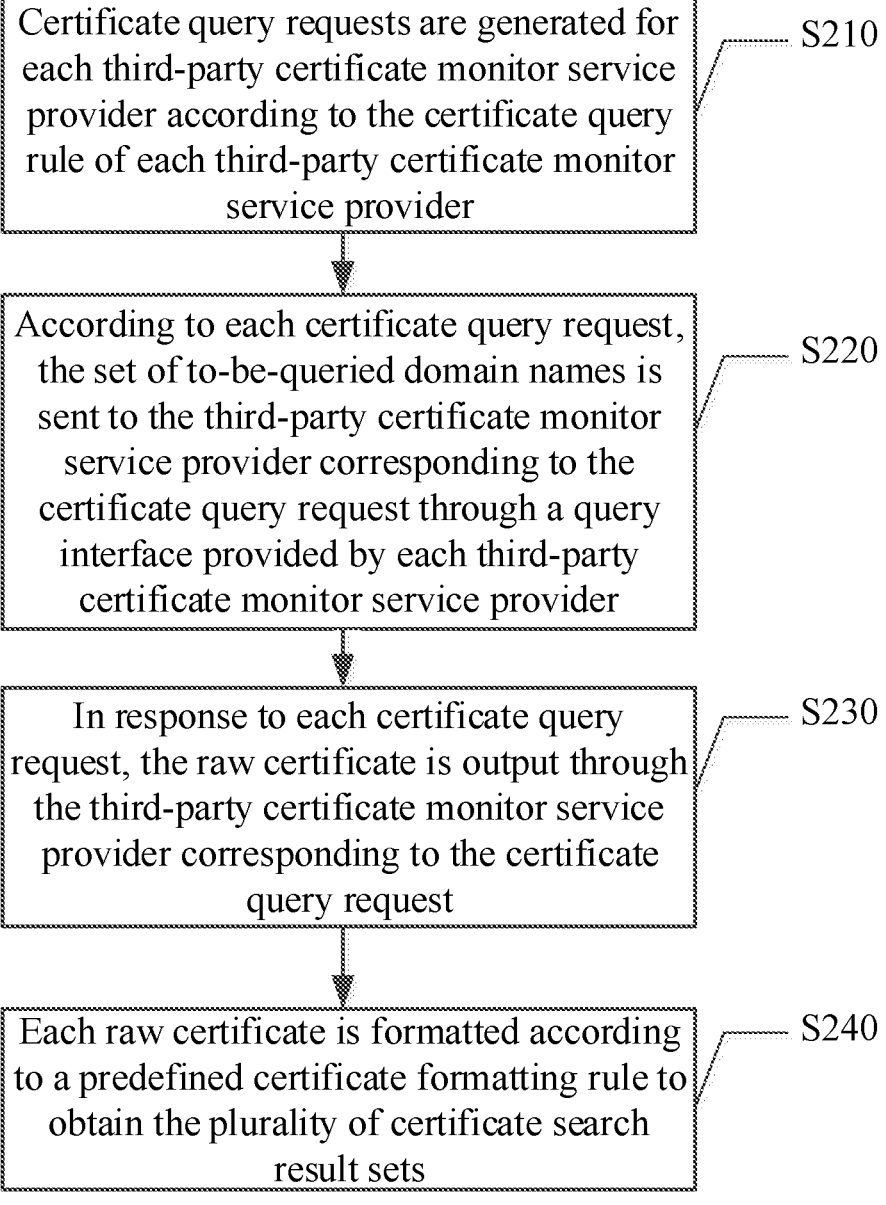

Certificate query requests are generated for each third-party certificate monitor service provider according to the certificate query rule of each third-party certificate monitor service provider — S210

According to each certificate query request, the set of to-be-queried domain names is sent to the third-party certificate monitor service provider corresponding to the certificate query request through a query interface provided by each third-party certificate monitor service provider — S220

In response to each certificate query request, the raw certificate is output through the third-party certificate monitor service provider corresponding to the certificate query request — S230

Each raw certificate is formatted according to a predefined certificate formatting rule to obtain the plurality of certificate search result sets — S240

FIG. 2

Figure 3:
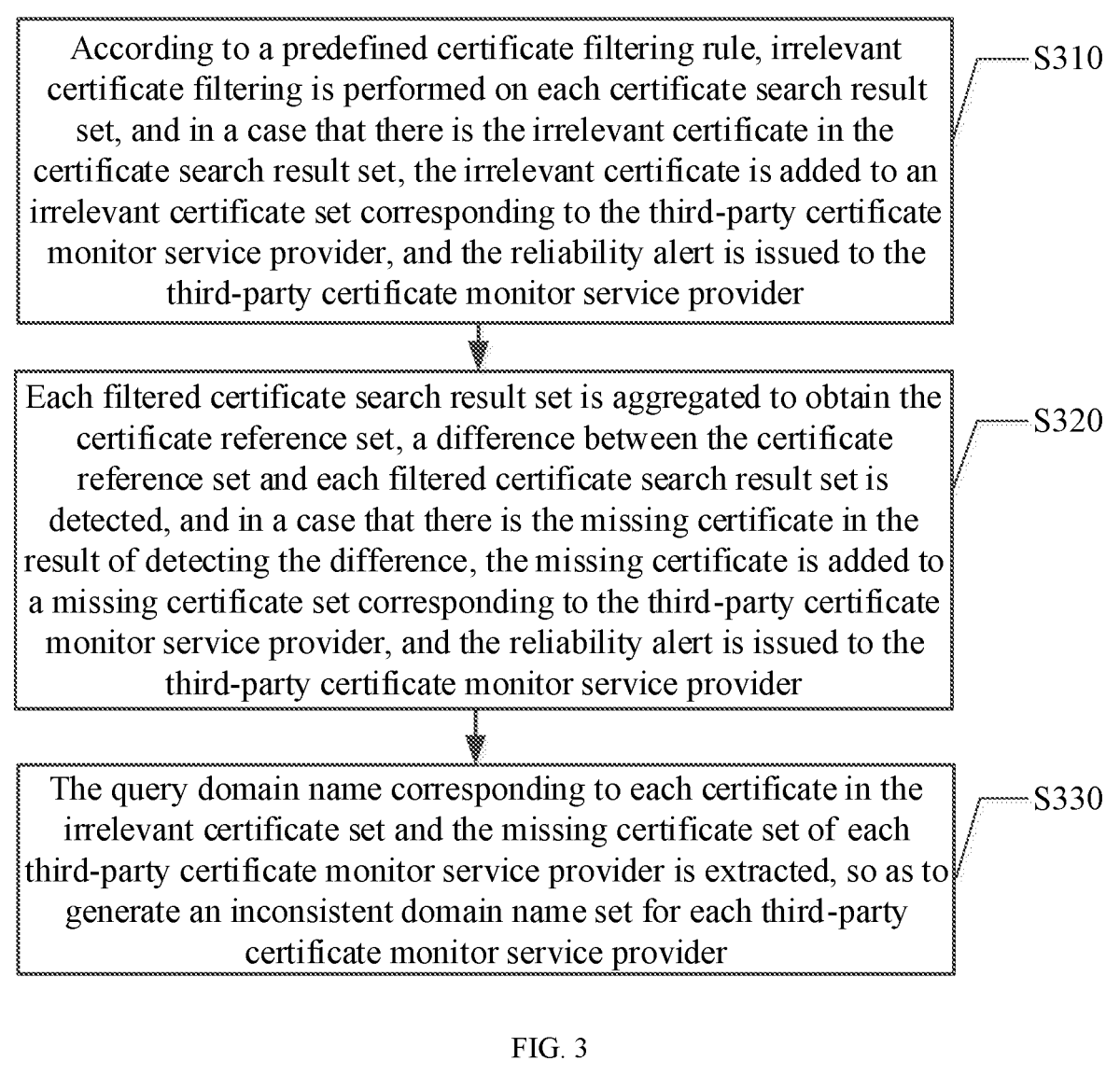

According to a predefined certificate filtering rule, irrelevant certificate filtering is performed on each certificate search result set, and in a case that there is the irrelevant certificate in the certificate search result set, the irrelevant certificate is added to an irrelevant certificate set corresponding to the third-party certificate monitor service provider, and the reliability alert is issued to the third-party certificate monitor service provider

— S310

Each filtered certificate search result set is aggregated to obtain the certificate reference set, a difference between the certificate reference set and each filtered certificate search result set is detected, and in a case that there is the missing certificate in the result of detecting the difference, the missing certificate is added to a missing certificate set corresponding to the third-party certificate monitor service provider, and the reliability alert is issued to the third-party certificate monitor service provider

— S320

The query domain name corresponding to each certificate in the irrelevant certificate set and the missing certificate set of each third-party certificate monitor service provider is extracted, so as to generate an inconsistent domain name set for each third-party certificate monitor service provider

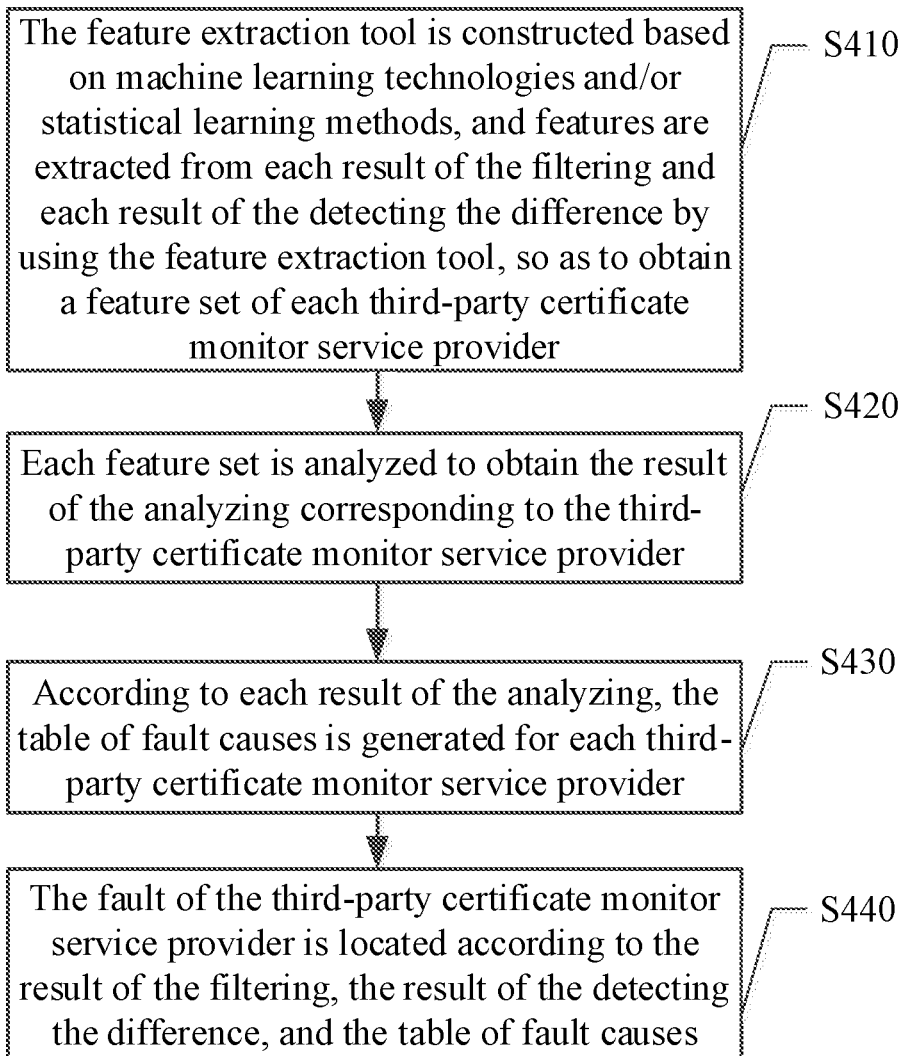

The feature extraction tool is constructed based on machine learning technologies and/or statistical learning methods, and features are extracted from each result of the filtering and each result of the detecting the difference by using the feature extraction tool, so as to obtain a feature set of each third-party certificate monitor service provider — S410

Each feature set is analyzed to obtain the result of the analyzing corresponding to the third-party certificate monitor service provider — S420

According to each result of the analyzing, the table of fault causes is generated for each third-party certificate monitor service provider — S430

The fault of the third-party certificate monitor service provider is located according to the result of the filtering, the result of the detecting the difference, and the table of fault causes — S440

FIG. 4

An inconsistent certificate is input and a classifier is trained — S510

A predefined rule is formulated — S520

An identifiable certificate is filtered — S530

A fault is analyzed and located — S540

600

Certificate collection module — 610

Difference detection module — 620

Fault analysis module — 630

CERTIFICATE MONITOR SERVICE RELIABILITY DETECTION METHOD FOR PKI CERTIFICATE TRANSPARENCY SYSTEM

CROSS REFERENCE TO RELATED APPLICATION(S)

This application is a Section 371 National Stage Application of International Application No. PCT/CN2023/088373, filed on Apr. 14, 2023, entitled "CERTIFICATE MONITOR SERVICE RELIABILITY DETECTION METHOD FOR PKI CERTIFICATE TRANSPARENCY SYSTEM", the entire content of which is incorporated herein in its entirety by reference.

TECHNICAL FIELD

The present disclosure relates to the field of trust management in computer security, in particular to a reliability detection method and system for a certificate monitor service in a PKI certificate transparency system.

BACKGROUND

Public Key Infrastructure (PKI) is a security infrastructure service based on the theory of public-key cryptography. The PKI system based on the digital certificate provides services such as identity authentication and encrypted data transmission for applications in the Internet.

Taking the widely deployed Web PKI as an example, in the PKI system, a domain owner first requests the Certificate Authority (CA) to issue a digital certificate. The CA then performs identity authentication on the domain owner, and if the authentication is successful, the CA issues the digital certificate for the domain owner to bind the identity of the domain owner and public key. When a client communicates with the web server by using TLS/HTTPS protocol, the authenticity of a communication opposite end is ensured by validating the digital certificate. This enables the key negotiation and establishes a secure communication connection. Therefore, as the trust anchor of the PKI system, the CA builds a trust foundation and facilitates trust propagation among network applications by issuing the digital certificate.

However, a series of security incidents in recent years indicate that CA organizations may issue a fraudulent certificate for some domains without authorization from the legitimate domain owners due to management negligence, improper operation, or leakage of CA private keys caused by attacks, etc. The fraudulent certificate binds the domain name to a key pair held by an attacker other than the legitimate domain owner, enabling the attacker to launch a man-in-the-middle or identity impersonation attack. The traditional PKI system lacks the ability to supervise CA and detect fraudulent certificates, and the existence of fraudulent certificates causes damage to the established PKI trust system.

Certificate Transparency (CT) is designed for detecting a fraudulent certificate in a timely manner and improving the ability of accountability for CA organizations. By introducing third-party log servers with the properties of append-only and tamper-resistant, the CT system requires that digital certificates issued by CA organizations must be submitted to some log servers.

In addition, in order to facilitate real-time monitoring of certificates recorded in the log servers by any relevant entity, the CT system introduces a core component, i.e., certificate monitor. The certificate monitor may be independently deployed by any stakeholder or third-party entity. The certificate monitor pre-selects a list of log servers to be monitored, and regularly fetches all certificate data recorded in the monitored log servers. It then parses, categorizes, and stores the certificate data, so as to provide certificate monitoring and retrieval service for requesters such as domain owners. Any entity may query, analyze, and follow the certificate information related to the domain name in real-time through the certificate monitor, so as to timely detect the fraudulent certificate which is issued without authorization.

Deploying and maintaining the certificate monitor requires high costs in terms of management, computation, and storage. Therefore, domain owners usually rely on professional third-party certificate monitor services offered by industry providers for certificate query and retrieval. This has resulted in the fact that certificate monitors, as an infrastructure for achieving the goal of transparency in CT systems, typically rely on only a few certificate monitor service providers to provide reliability guarantees. It has been proved by related research that some third-party certificate monitor service providers cannot guarantee timely and reliable certificate monitoring or query services, and it is difficult to ensure that the requesters such as domain owners obtain all relevant certificates that have been recorded on the log servers. At this point, fraudulent certificates are actually non-transparent to the domain owners who use the certificate monitor service. Therefore, if there is a fraudulent certificate that satisfies the browser's CT policy but cannot be monitored or retrieved through the certificate monitor, attackers can exploit such certificate to launch a man-in-the-middle or identity impersonation attacks.

How to continuously and efficiently assess the quality of certificate query and monitoring service of the certificate monitor, analyze and locate potential fault causes, and provide improvement suggestions for enhancing the service quality of the certificate monitor under the premise of limited computing and storage resources, so as to improve the reliability of the related PKI CT, is still a problem that needs to be solved, and there is currently no relevant technical solution.

SUMMARY

According to a first aspect of the present disclosure, there is provided a reliability detection method for a certificate monitor service in a PKI CT system, including:

sending a randomly generated set of to-be-queried domain names to a plurality of third-party certificate monitor service providers, and processing the collected raw certificates output from these providers to generate multiple certificate search result sets;

for each queried domain name, filtering and aggregating the plurality of certificate search result sets to obtain a certificate reference set, detecting a difference between each certificate search result set and the certificate reference set; and issuing a reliability alert to the third-party certificate monitor service provider in a case that there is an irrelevant certificate and/or a missing certificate in the certificate search result set; and extracting features from the filtered results and differential analysis results by using a feature extraction tool, analyzing the extracted features, generating, based on a result of the analyzing, a table of fault causes each of which induces a fault of the third-party certificate monitor service provider, and locating the fault of the third-party certificate monitor service provider according to the result of the filtering, the result of differential analysis, and the table of fault causes.

According to embodiments of the present disclosure, the above-mentioned sending a randomly generated set of to-be-queried domain names to a plurality of third-party certificate monitor service providers, and processing the collected raw certificates output by the plurality of third-party certificate monitor service providers to obtain a plurality of certificate search result sets includes:

generating a certificate query request for each third-party certificate monitor service provider according to a certificate query rule of each third-party certificate monitor service provider, wherein the certificate query request meets a corresponding certificate query requirement and conforms to a query strategy of the third-party certificate monitor service provider;

sending, according to each certificate query request, the set of to-be-queried domain names to the third-party certificate monitor service provider corresponding to the certificate query request through a query interface provided by each third-party certificate monitor service provider;

outputting, in response to each certificate query request, the raw certificate through the third-party certificate monitor service provider corresponding to the certificate query request; and formatting each raw certificate according to the predefined certificate formatting rules to obtain the plurality of certificate search result sets.

According to embodiments of the present disclosure, the above-mentioned certificate query rule includes a query method supported by the third-party certificate monitor service provider;

wherein the certificate formatting rules include generating, for each certificate, a unified output information and a unique certificate identifier; and wherein the certificate identifier is constructed based on the certificate serial number, issuer, and certificate validity period.

According to embodiments of the present disclosure, the above-mentioned filtering and aggregating the plurality of certificate search result sets to obtain a certificate reference set, detecting a difference between each certificate search result set and the certificate reference set; and issuing a reliability alert to the third-party certificate monitor service provider in a case that there is an irrelevant certificate and/or a missing certificate in the certificate search result set includes:

performing irrelevant certificate filtering on each certificate search result set according to a predefined certificate filtering rule, and in a case that there is an irrelevant certificate in the certificate search result set, adding the irrelevant certificate to the irrelevant certificate set corresponding to the third-party certificate monitor service provider, and issuing a reliability alert to the third-party certificate monitor service provider;

aggregating each filtered certificate search result set to obtain the certificate reference set, detecting a difference between the certificate reference set and each filtered certificate search result set, and in a case that there is a missing certificate in the result of the detecting the difference, adding the missing certificate to the missing certificate set corresponding to the third-party certificate monitor service provider, and issuing a reliability alert to the third-party certificate monitor service provider; and extracting the query domain name corresponding to each certificate in the irrelevant certificate set and the missing certificate set of each third-party certificate monitor service provider, so as to generate an inconsistent domain name set for each third-party certificate monitor service provider.

According to embodiments of the present disclosure, the above-mentioned irrelevant certificate includes a certificate that has been erroneously processed due to implementation and design defects by the third-party certificate monitor service providers, wherein an information of each certificate in the irrelevant certificate set and the missing certificate set includes the query domain name, SHA-256 fingerprint, serial number, certificate validity period, certificate issuer, certificate subject, log servers to which the certificate is submitted, target domain name, and the storage format of the certificate in the log server; and wherein an information of each domain name in the inconsistent domain name set includes the query domain name, query time, the number of certificates in the reference set, the number of certificates in the irrelevant certificate set corresponding to the domain name, and the number of certificates in the missing certificate set corresponding to the domain name.

According to embodiments of the present disclosure, the above-mentioned extracting features from the filtered results and differential analysis results by using a feature extraction tool, analyzing the extracted features, generating, based on a result of the analyzing, a table of fault causes each of which induces a fault of the third-party certificate monitor service provider, and locating the fault of the third-party certificate monitor service provider according to the result of the filtering, the result of the detecting the difference, and the table of fault causes includes:

constructing a feature extraction tool based on machine learning technologies and/or statistical learning methods, and extracting features from each result of the filtering and each result of the detecting the difference by using the feature extraction tool, so as to obtain a feature set of each third-party certificate monitor service provider;

analyzing each feature set to obtain analysis results corresponding to the third-party certificate monitor service provider;

generating, according to each result of the analyzing, the table of fault causes for each third-party certificate monitor service provider; and locating the fault of the third-party certificate monitor service provider according to the result of the filtering, the result of the detecting the difference, and the table of fault causes.

According to embodiments of the present disclosure, the reference of the above-mentioned table of fault causes includes a log server attribute information of the third-party certificate monitor service provider, a format information of the certificate in a log server, a target domain name matched by the certificate and a number of the target domain names, a certificate validity period, and a quantity information of the raw certificate set.

According to embodiments of the present disclosure, the above-mentioned fault locating further includes using a black-box testing method to locate a fault occurring during an internal working process,

wherein a judgment basis for the black-box testing includes a search result based on the SHA-256 certificate fingerprint and/or the search results based on the target domain name matched by the certificate;

in a case that the search result based on the SHA-256 certificate fingerprint is that a corresponding certificate is not found, it is determined that the fault of the third-party certificate monitor service provider occurs in a certificate fetch stage or a certificate storage stage; and in a case that the search result based on the target domain name matched by the certificate is that a corresponding certificate is not found, it is determined that the fault of the third-party certificate monitor service provider occurs in a certificate query stage or a certificate result return stage.

According to embodiments of the present disclosure, an information of each certificate element in the above-mentioned certificate search result set includes a subject information extracted from the certificate, the domain name information contained in the Subject Alternative Name (SAN) extension, certificate serial number, SHA-256 fingerprint, issuer, certificate validity period, log server information, query domain name, target domain name matched by the certificate in the raw certificate set, and storage format of the certificate in the log server.

According to the second aspect of the present disclosure, there is provided a reliability detection system for a certificate monitor service in PKI CT system, including:

a certificate collection module configured to send a randomly generated set of to-be-queried domain names to a plurality of third-party certificate monitor service providers, and process collected raw certificates output by the plurality of third-party certificate monitor service providers to obtain multiple certificate search result sets;

a difference detection module configured to filter and aggregate the multiple certificate search result sets to obtain a certificate reference set, detect a difference between each certificate search result set and the certificate reference set; and issue a reliability alert to the third-party certificate monitor service provider in a case that there is an irrelevant certificate and/or a missing certificate in the certificate search result set; and a fault analysis module configured to extract features from a result of the filtering and a result of the detecting the difference by using a feature extraction tool, analyze the extracted features, generate, based on a result of the analyzing, a table of fault causes each of which induces a fault of the third-party certificate monitor service provider, and locate the fault of the third-party certificate monitor service provider according to the result of the filtering, the result of the detecting the difference, and the table of fault causes.

BRIEF DESCRIPTION OF THE DRAWINGS

FIG. 1 shows a flowchart of a reliability detection method for a certificate monitor service in a PKI CT system according to an embodiment of the present disclosure.

FIG. 2 shows a flowchart of acquiring a certificate search result set according to an embodiment of the present disclosure.

FIG. 3 shows a flowchart of difference detection and alert according to an embodiment of the present disclosure.

FIG. 4 shows a flowchart of performing fault analysis and locating according to an embodiment of the present disclosure.

Figure 5:
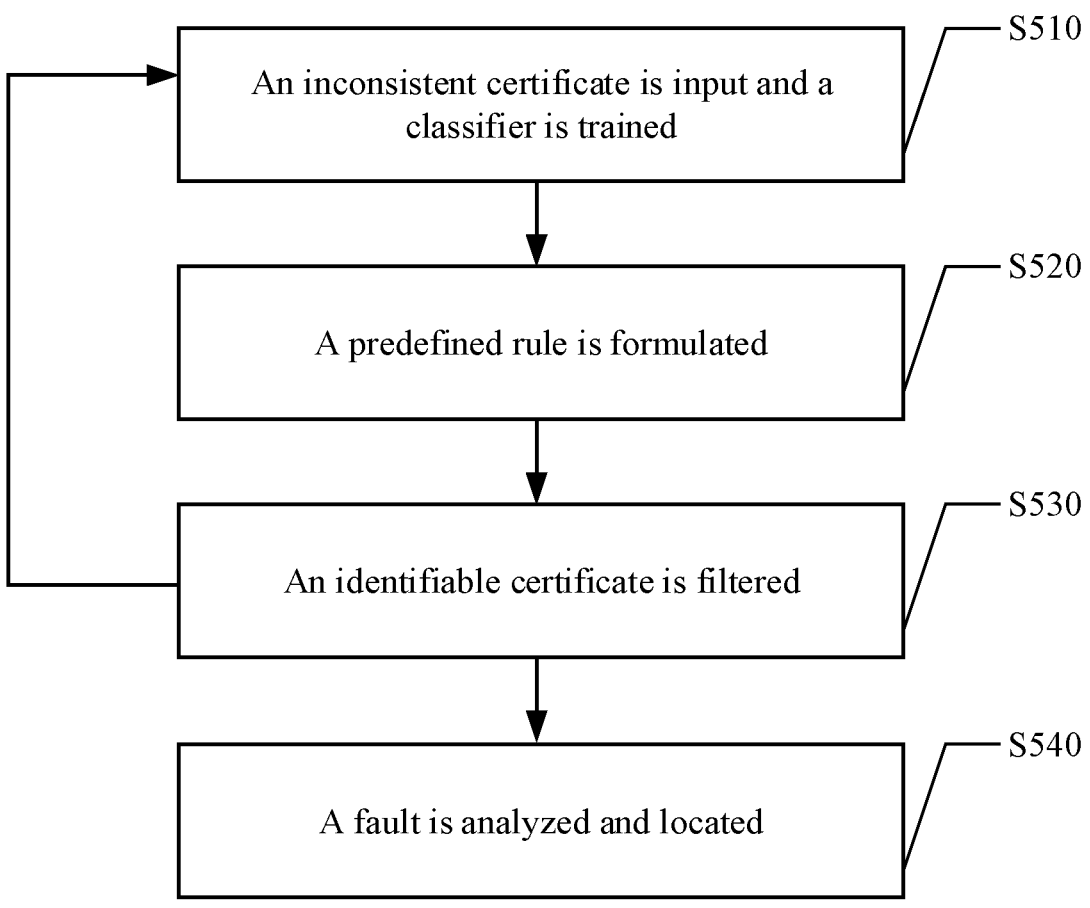

FIG. 5 shows a flowchart of performing fault analysis and locating according to another embodiment of the present disclosure.

Figure 6:
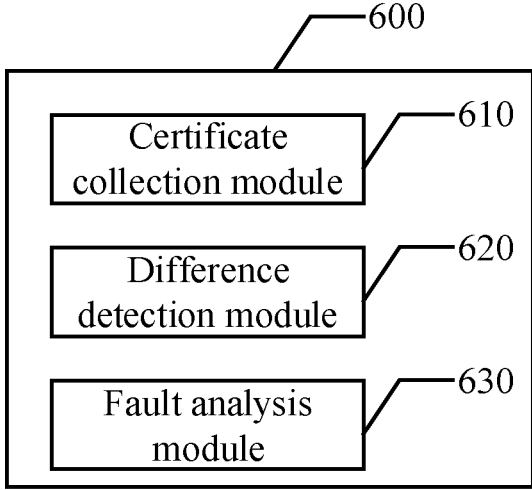

FIG. 6 shows a schematic structural diagram of a reliability detection system for a certificate monitor service in a PKI CT system according to an embodiment of the present disclosure.

DETAILED DESCRIPTION OF EMBODIMENTS

In order to make objectives, technical solutions and advantages of the present disclosure more apparent and understandable, the present disclosure is further described in detail below in combination with specific embodiments and with reference to the accompanying drawings.

The certificate monitoring services widely used in the current CT system are only concentrated on a few third-party certificate monitors and may not guarantee the return of the complete certificate query result, which may lead to unauthorized fraudulent certificates being trusted and accepted by the client, resulting in the CT system not achieving its expected effect. The related CT system lacks effective detection tools and means for measuring and evaluating the improper behavior or service quality of the certificate monitor, and may not transparently know the reliability of the service of the related certificate monitor.

In view of the deficiencies in the prior related art, the present disclosure aims to design a framework for checking the quality of service of the certificate monitor. In resource constrained scenarios, the potential cause of the fault of the certificate monitor is located and analyzed by aggregating the certificate monitoring results of a plurality of certificate monitors and comparing the difference between different certificate monitors in certificate processing, so that the certificate monitoring and the query service quality of the certificate monitor service provider may be efficiently and reasonably evaluated and measured, so as to send an alert on the fault, thereby improving the reliability of PKI CT service.

The technical solutions disclosed in the present disclosure have obtained authorization from the third-party certificate monitor service providers in the process of fetching relevant certificate information, query strategies, application program interfaces (API) of query services, and the like of the third-party certificate monitor service providers. The above data are processed, applied, and stored under the permission of third-party certificate monitor service providers. The relevant process complies with the provisions of laws and regulations, and necessary and reliable confidentiality measures have been taken, which are in line with the requirements of public order and good customs.

The technical solutions provided in the present disclosure are further described in detail below in combination with specific embodiments and the accompanying drawings.

FIG. 1 shows a flowchart of a reliability detection method for a certificate monitor service in a PKI CT system according to an embodiment of the present disclosure.

As shown in FIG. 1, the above-mentioned reliability detection method for the certificate monitor service in the PKI CT system includes operations S110 to S130.

In operation S110, a randomly generated set of to-be-queried domain names is sent to a plurality of third-party certificate monitor service providers, and collected raw certificates output by the plurality of third-party certificate monitor service providers are processed to obtain a plurality of certificate search result sets.

The above-mentioned certificate search result set represents a set of certificates formed by formatting the certificate data collected from a single certificate monitor.

The domain name in the above-mentioned set of to-be-queried domain names is related to a plurality of certificates. Taking a to-be-queried domain name C.B.A as an example, the certificates related to the domain name include: (1) a certificate issued for the domain name C.B.A; (2) a certificate issued for a sub-domain name of the domain name C.B.A (e.g., D.C.B.A sub-domain name) or a sub-domain name with an asterisk label (e.g., *.C.B.A sub-domain name); (3) if C.B.A is not an effective top level domain, the related certificates further include a certificate issued for a parent domain name *.B.A with an asterisk label.

According to embodiments of the present disclosure, an information of each certificate element in the above-mentioned certificate search result set includes subject information extracted from the certificate, domain name information contained in the SAN extension, certificate serial number, SHA-256 fingerprint, issuer, certificate validity period, log server information, query domain name, target domain names matched by the certificate in the raw certificate set, and the storage format of the certificate in the log server.

In operation S120, the plurality of certificate search result sets are filtered and aggregated to obtain a certificate reference set, a difference between each certificate search result set and the certificate reference set is detected; and a reliability alert is issued to the third-party certificate monitor service provider in a case that there is an irrelevant certificate and/or a missing certificate in the certificate search result set.

The above-mentioned certificate reference set represents a reference set formed by aggregating filtered search result sets from the plurality of third-party certificate monitor service providers.

In a case that there is an irrelevant certificate in a result of the filtering and/or there is a missing certificate in a result of the detecting the difference, the case indicates that there may be a fault in the third-party certificate monitor service provider. At this point, reliability alert should be sent to the third-party certificate monitor service provider.

In operation S130, features are extracted from a result of the filtering and a result of the detecting the difference by using a feature extraction tool, the extracted features are analyzed, a table of fault causes each of which induces a fault of the third-party certificate monitor service provider is generated based on a result of the analyzing, and the fault of the third-party certificate monitor service provider is located according to the result of the filtering, the result of the detecting the difference, and the table of fault causes.

The above-mentioned reliability detection system for the certificate monitor service in the PKI CT system provided in the present disclosure achieves the difference detection of certificate monitoring and query service quality of different certificate monitor service providers through continuous certificate data collection for any randomly input domain name. For certificate monitors with problems or faults, the solution of the present disclosure enables a timely alert on the faults. Meanwhile, the above-mentioned method provided in the present disclosure may better understand, discover, and locate internal defects in the certificate monitor, and improve the effective analysis efficiency of the certificate monitor service fault, which not only improves the reliability service of the certificate monitor, but also enhances the reliability of the related PKI CT service.

FIG. 2 shows a flowchart of acquiring a certificate search result set according to an embodiment of the present disclosure.

As shown in FIG. 2, the above-mentioned sending a randomly generated set of to-be-queried domain names to a plurality of third-party certificate monitor service providers, and processing collected raw certificates output by the plurality of third-party certificate monitor service providers to obtain a plurality of certificate search result sets includes operation S210 to operation S240.

In operation S210, certificate query requests are generated for each third-party certificate monitor service provider according to the certificate query rule of each third-party certificate monitor service provider, wherein the certificate query request meets a certificate query requirement set by the user and conforms to a query strategy of the third-party certificate monitor service provider.

In operation S220, according to each certificate query request, the set of to-be-queried domain names is sent to the third-party certificate monitor service provider corresponding to the certificate query request through a query interface provided by each third-party certificate monitor service provider.

In operation S230, in response to each certificate query request, the raw certificate is output through the third-party certificate monitor service provider corresponding to the certificate query request.

In operation S240, each raw certificate is formatted according to a certificate formatting rule set by the user to obtain the plurality of certificate search result sets.

The above-mentioned operations aim to acquire the certificate search result set. The above-mentioned operations are further described in detail below in combination with specific embodiments.

First, the domain name query rules of a plurality of currently deployed certificate monitor service providers are analyzed and extracted. In the embodiments of the present disclosure, the following three types of information related to the certificate monitor service are mainly focused on when analyzing and extracting rules: (1) certificate source; the list of log servers monitored by each certificate monitor is analyzed; for a certificate monitor that does not disclose the list of log servers, the certificate monitor monitors all non-test log servers by default in this embodiment; specifically, for the certificate data obtained through active scanning by the certificate monitor, certificates obtained from the above channels are excluded in the embodiments of the present disclosure; (2) query strategy; the query strategy supported by each certificate monitor is analyzed, such as whether the query modes such as domain name, SHA-256 certificate fingerprint and the like are supported; in addition, for the convenience of certificate collection and fault analysis in the next stage, different certificate monitors are compared and summarized from the following three aspects at the same time in the embodiments of the present disclosure, including search rules, input domain name and matching certificate results, and whether the returned result includes an expired certificate; (3) return result; the certificate basic information (such as the issuer of the certificate, dNSName, expiration time, etc.) returned by each certificate monitor is analyzed; in addition, for each certificate query, whether the certificate monitor limits the number of returned results is analyzed.

Second, a domain name query scheduler is constructed, the to-be-queried domain name is loaded from the generated random test domains, and a query task is created for each certificate monitor.

Optionally, when the test case contains a plurality of query domain names, multithreading is used in the embodiments of the present disclosure to improve the certificate search efficiency and reduce service latency caused by returning certificate results. In addition, for each to-be-queried domain name, the effective top level domain is filtered using a public suffix list in the embodiments of the present disclosure.

Finally, based on the certificate query rule and API query syntax of each certificate monitor collected through the above-mentioned operations, a unique certificate scraping program may be created for each certificate monitor.

Optionally, for the convenience of subsequent operations (such as operation S130), in the embodiments of the present disclosure, the original output of each certificate monitor is formatted to generate a certificate search result set.

The above-mentioned certificate search result set includes various information, mainly including: (1) observable information, including subject information extracted from the certificate, domain name information contained in the SAN extension, certificate serial number, SHA-256 fingerprint, issuer, certificate validity period, log server information, and the like; (2) processable information, including queried domain name, the matched target domain name in the returned certificate results, and the storage format of the certificate in the log server (such as pre certificate or final certificate).

The matched target domain name refers to other domain name information that matches the query domain name in the domain name information included in the SAN extension.

Specifically, for each certificate in the search result set, a quadruplet is constructed based on the certificate serial number, the issuer, and the certificate validity period (including the start date and the expiration date) to serve as a unique identifier for the certificate in the embodiments of the present disclosure.

According to embodiments of the present disclosure, the above-mentioned certificate query rule includes a query method supported by the third-party certificate monitor service provider.

The certificate formatting rule includes generating, for each certificate, a unified output information and a unique certificate identifier.

The certificate identifier is constructed based on the certificate serial number, the issuer, and the certificate validity period.

FIG. 3 shows a flowchart of difference detection and alert according to an embodiment of the present disclosure.

As shown in FIG. 3, for each queried domain name, the above-mentioned filtering and aggregating the plurality of certificate search result sets to obtain a certificate reference set, detecting a difference between each certificate search result set and the certificate reference set, and issuing a reliability alert to the third-party certificate monitor service provider in a case that there is an irrelevant certificate and/or a missing certificate in the certificate search result set includes operation S310 to operation S330.

In operation S310, according to a certificate filtering rule set by the user, irrelevant certificate filtering is performed on each certificate search result set, and in a case that there is the irrelevant certificate in the result of filtering, the irrelevant certificate is added to an irrelevant certificate set corresponding to the third-party certificate monitor service provider, and the reliability alert is issued to the third-party certificate monitor service provider.

According to embodiments of the present disclosure, the above-mentioned irrelevant certificate includes a certificate obtained by the third-party certificate monitor service provider performing erroneous processing on a certificate.

The information of each certificate in the irrelevant certificate set and the missing certificate set includes the query domain name, SHA-256 fingerprint, serial number, certificate validity period, certificate issuer, log server to which the certificate is submitted, target domain name, and the storage format of the certificate in the log server.

In operation S320, each filtered certificate search result set is aggregated to obtain the certificate reference set, a difference between the certificate reference set and each filtered certificate search result set is detected, and in a case that there is the missing certificate in the result of the detecting the difference, the missing certificate is added to a missing certificate set corresponding to the third-party certificate monitor service provider, and the reliability alert is issued to the third-party certificate monitor service provider.

In operation S330, the query domain name corresponding to each certificate in the irrelevant certificate set and the missing certificate set of each third-party certificate monitor service provider is extracted, so as to generate an inconsistent domain name set for each third-party certificate monitor service provider.

The information of each record in the inconsistent domain name set includes the query domain name, query time, a number of certificates in the reference set, a number of certificates in the irrelevant certificate set corresponding to the domain name, and a number of certificates in the missing certificate set corresponding to the domain name.

In order to better illustrate the above-mentioned operations S310 to S330, the above-mentioned operations are further described in detail below in combination with specific embodiments.

First, for the formatted certificate search result sets, an irrelevant certificate is removed according to the predefined certificate processing rule. The above-mentioned processed search result sets are aggregated to construct a reference set for the to-be-queried domain name.

Specifically, the certificate filtering rule involves the certificate processing that is not related to the query domain name in the returned result of the certificate monitor.

The irrelevant certificates include the following categories: (1) the certificate monitor may perform erroneous processing on a certificate, for example, the certificate monitor incorrectly marks an expired certificate as an unexpired certificate or incorrectly parses the certificate; (2) the experimental design itself has the flaws, such as the operator's misunderstanding for the search strategy of the certificate monitor during the data collection process, failing to filter the certificate data obtained from the active scanning of the certificate monitor, and the like.

Specifically, there is a service delay in each certificate monitor, i.e., a difference in time between the certificate issuance time and the time at which the certificate first appears in the returned result of the certificate monitor. Therefore, the maximum delay of the certificate monitor is limited to 24 hours in the embodiments of the present disclosure, and for a certificate with a delay greater than 24 hours, the certificate is classified as certificate missing caused by the defect of the certificate monitor itself.

Specifically, the above-mentioned reference set is assumed as a real dataset of to-be-queried domain name related certificates in a real scenario in the embodiments of the present disclosure.

Second, the irrelevant certificate and the missing certificate (collectively referred to as an inconsistent certificate) are identified. Optionally, the above-mentioned filtered irrelevant certificate is added to the corresponding irrelevant certificate set. In addition, by comparing the filtered search result set of a single certificate monitor and the reference set, it may be further discovered that there is the missing certificate in the certificate monitor, and the missing certificate is added to the corresponding missing certificate set.

Finally, the corresponding query domain name information in the irrelevant certificate or the missing certificate is extracted and added to an inconsistent domain name set, and the irrelevant certificate set and the missing certificate set corresponding to the query domain name are output at the same time.

Specifically, for the inconsistent certificate, if the inconsistent certificate is caused by erroneous processing of the certificate monitor on the domain name, it is difficult to identify the cause of the fault solely by analyzing the certificate.

To this end, for each inconsistent certificate in the irrelevant certificate set and the missing certificate set, the query domain name relative to the certificate is extracted to construct the inconsistent domain name set in the embodiments of the present disclosure. The inconsistent domain name set may include the query domain name, query time, the number of certificates in the reference set, the number of certificates in the irrelevant certificate set corresponding to the domain name, and the number of certificates in the missing certificate set corresponding to the domain name.

FIG. 4 shows a flowchart of fault analysis and locating according to an embodiment of the present disclosure.

As shown in FIG. 4, the above-mentioned extracting features from a result of the filtering and a result of the detecting the difference by using a feature extraction tool, analyzing the extracted features, generating, based on a result of the analyzing, a table of fault causes each of which induces a fault of the third-party certificate monitor service provider, and locating the fault of the third-party certificate monitor service provider according to the result of the filtering, the result of the detecting the difference, and the table of fault causes includes operation S410 to operation S440.

In operation S410, the feature extraction tool is constructed based on machine learning technologies and/or statistical learning methods, and features are extracted from the result of the filtering and the result of the detecting the difference by using the feature extraction tool, so as to obtain a feature set of each third-party certificate monitor service provider.

In operation S420, each feature set is analyzed to obtain the result of the analyzing corresponding to the third-party certificate monitor service provider.

In operation S430, according to each result of the analyzing, the table of fault causes is generated for each third-party certificate monitor service provider.

In operation S440, the fault of the third-party certificate monitor service provider is located according to the result of the filtering, the result of the detecting the difference, and the table of fault causes.

In order to better illustrate the above-mentioned fault locating operation, the present disclosure provides further detailed explanations on the above-mentioned fault locating technical solution in combination with a plurality of embodiments.

In one specific embodiment, first, a machine learning model is used to extract features from the result of the filtering and the result of the detecting the difference, respectively, to obtain a feature set. The result of the filtering and the result of the detecting the difference are the irrelevant certificate set and the missing certificate set corresponding to each domain name in the inconsistent domain name set, respectively.

Second, the features in the feature set are sorted, and the output is used to guide the generation of a table of fault causes each of which may induce a fault of the certificate monitor.

According to embodiments of the present disclosure, the reference information for the above-mentioned fault cause further includes a log server attribute information of the third-party certificate monitor service provider, a format information of the certificate in a log server, the target domain matched by the certificate, a number of the target domains, certificate validity period, and a quantity information of the raw certificate set.

The above-mentioned fault causes may be classified into the following two categories: (1) if the certificate feature related to a certain fault causes the missing of the certificates in a high probability (relative to the certificate), then the fault belongs to Class I fault; (2) if the certificate feature related to a certain fault causes a high proportion of the certificates (relative to the set) in the irrelevant certificate set or the missing certificate set, then the fault belongs to Class II fault.

Assuming the certificate monitor is represented as m, a certain fault in the table of fault causes is represented as $R_i$, the irrelevant certificate set or the missing certificate set is represented as $IC_m$, the number of certificates that match the fault $R_i$ in all certificates of the to-be-queried domain name is represented as $T_d$, and an expected value is $E_i$, the present disclosure further provides the following measurement methods to calculate the degree of correlation between a certain type of fault and the inconsistent certificate.

Class I fault measurement method: calculating a ratio of the number of certificates matching the fault $R_i$ in the irrelevant certificate set or the missing certificate set of the current certificate monitor to the number of certificates matching the fault $R_i$ in all the certificates, as shown in equation (1):

$$P = \frac{\# \text{ of cert.} \in IC_m \text{ matching } R_i}{\# \text{ of cert.} \in \bigcup_{d \in [domain\,input]} T_d \text{ matching } R_i} \tag{1}$$

Class II fault measurement method: assuming the fault $R_i$ is independent of the inconsistent certificate, according to the Cramer's V correlation coefficient calculation rule, respectively calculating the expected value $E_i$, chi-square distribution $X^2$, and Cramer's V value V between the fault $R_i$ and the inconsistent certificate in the irrelevant certificate set or the missing certificate set, the equation is shown as equation set (I):

$$E_i = n * p_i; \; X^2 = \sum_{i=1}^{2} \frac{(O_i - E_i)^2}{E_i}; \; V = \sqrt{\frac{x^2}{n}} \tag{I}$$

$O_i$ represents the number of certificates with the fault $R_i$ matching or not matching the inconsistent certificate, n is the number of inconsistent certificates, and $p_i$ is the proportion of the certificates matching or not matching the fault $R_i$ in the total certificate set.

Third, certificate matching is performed on the irrelevant certificate set or the missing certificate set by using the table of fault causes, and the certificate that meets the table of fault causes is deleted from the corresponding irrelevant certificate set or missing certificate set, so as to obtain a further filtered irrelevant certificate set or missing certificate set.

Finally, for the certificate data in the missing certificate set that cannot subjected to fault attribution by using the table of fault causes, further black-box testing is performed on the third-party certificate monitor service provider to obtain fault information of the third-party certificate monitor service provider.

FIG. 5 shows a flowchart of performing fault analysis and locating according to another embodiment of the present disclosure.

The above-mentioned fault analysis operation is further described in detail below in combination with FIG. 5 and the specific embodiments.

In operation S510, by using the irrelevant certificate set and the missing certificate set obtained from the above-mentioned operation as inputs respectively, two random forest classifiers are trained for each certificate monitor by means of a machine learning model, to predict whether a certificate with a corresponding feature is in the returned result of the irrelevant certificate set and the missing certificate set, respectively.

Optionally, for this stage, embodiments of the present disclosure do not consider unpredictable results caused by malicious or attacker-fully-controlled certificate monitors, but only focuses on internal defects in the certificate monitor or incorrect behavior that occurs during its operation.

Specifically, in the embodiments of the present disclosure, a random forest classifier is used to train the model, and model performance is evaluated using F−1 score.

In operation S520, a table of fault causes is defined with reference to the feature ranking output by the model in above-mentioned operation S510 and in combination with the features analyzed from other perspectives (such as log server, certificate, etc.).

Specifically, a reference of the table of fault causes includes: (1) log server attributes, such as the organization operating the log server, growth rate, etc.; (2) the format information of the certificate in the log server; (3) the target domain matched by the certificate and the number of the target domains; (4) the validity period of the certificate; (5) the number of certificates originally output.

In operation S530, the table of fault causes identified in operation S520 is used for labeling certificates that match the corresponding fault in the irrelevant certificate set or the missing certificate set, and the certificates are removed from the corresponding set. The remaining certificates in the set continue to serve as inputs for operation S510 to enhance the effectiveness of the machine learning model.

In operation S540, for a certificate that fails to match the corresponding fault in the missing certificate set of operation S530, a black-box testing method is further performed to locate the fault occurring in the internal working process of the monitor.

Specifically, a judgment basis for a black-box testing provided by embodiments of the present disclosure is as follows: (1) the above certificate is searched based on the SHA-256 certificate fingerprint; if the certificate is not found, it indicates that the fault possibly occurs in a certificate fetching stage or a certificate storage stage, that is, in a case that the search result based on the SHA-256 certificate fingerprint is that the corresponding certificate is not found, it is determined that the fault of the third-party certificate monitor service provider occurs in the certificate fetching stage or the certificate storage stage; (2) in a case that the search result based on the target domain name matched by the certificate is that the corresponding certificate is not found, it is determined that the fault of the third-party certificate monitor service provider occurs in a certificate query stage or a certificate result return stage.

Optionally, the above-mentioned black-box testing method may also be used for black-box testing performed on the certificates in the missing certificate set that may match the corresponding faults in operation S530.

FIG. 6 shows a schematic structural diagram of a reliability detection system for a certificate monitor service in a PKI CT system according to an embodiment of the present disclosure.

As shown in FIG. 6, the above-mentioned reliability detection system 600 for a certificate monitor service in a PKI CT system includes a certificate collection module 610, a difference detection module 620, and a fault analysis module 630.

The certificate collection module 610 is used to send a randomly generated set of to-be-queried domain names to a plurality of third-party certificate monitor service providers, and process collected raw certificates output by the plurality of third-party certificate monitor service providers to obtain a plurality of certificate search result sets.

The certificate collection module 610 randomly generates a group of to-be-queried domain name lists as module input. Then, the certificate collection module generates correct query requests for the above domain name lists according to the certificate query strategies and query syntax issued by each certificate monitor, and executes queries through the APIs provided by each certificate monitor. Finally, the raw output returned by each certificate monitor is formatted to form a search result set.

The difference detection module 620 is used to filter and aggregate the plurality of certificate search result sets to obtain a certificate reference set, detect a difference between each certificate search result set and the certificate reference set; and issue a reliability alert to the third-party certificate monitor service provider in a case that there is an irrelevant certificate and/or a missing certificate in the certificate search result set.

The difference detection module 620 filters the irrelevant certificate in the certificate search result set according to the corresponding certificate processing rule (such as the definition of the irrelevant certificate). All filtered search result sets above are aggregated to generate a group of reference sets with a unique certificate index. The reference set will serve as a complete dataset of domain name related certificates. Therefore, the missing certificate information of the certificate monitor may be obtained by comparing the search result set from a single certificate monitor and the reference set. The irrelevant certificate and the missing certificate are added to the corresponding certificate set, respectively. Then, other information such as the corresponding query domain name in the above-mentioned irrelevant certificate and missing certificate are extracted. Finally, for each certificate monitor, the difference detection module outputs the inconsistent domain name set, as well as the irrelevant certificate set and the missing certificate set corresponding to each domain name in the inconsistent domain name set. The irrelevant certificate set and the missing certificate set further serve as inputs to the fault analysis module.

The fault analysis module 630 is used to extract features from a result of the filtering and a result of the detecting the difference by using a feature extraction tool, analyze the extracted features, generate, based on a result of the analyzing, a table of fault causes each of which induces a fault of the third-party certificate monitor service provider, and locate the fault of the third-party certificate monitor service provider according to the result of the filtering, the result of the detecting the difference, and the table of fault causes.

The fault analysis module 630 is used to infer the reason why each certificate monitor failed to return the complete domain name related certificate. Specifically, the module uses the machine learning model to extract the mode features of inconsistent certificates returned in each certificate monitor, which is used to guide the formulation of the late-stage table of fault causes. In addition, in order to improve the accuracy of the model, the above table of fault causes may be further divided into the following two categories: (1) if the certificate feature related to a certain fault causes the missing of the certificates in a high probability (relative to the certificate), then the fault belongs to Class I fault; (2) if the certificate feature related to a certain fault causes a high proportion of the certificates (relative to the set) in the irrelevant certificate set or the missing certificate set, then the fault belongs to Class II fault. In order to improve the accuracy of the model, certificate matching is performed on the irrelevant certificate set or the missing certificate set based on the above-mentioned table of fault causes, and the certificate that meets the above-mentioned table of fault causes is deleted from the irrelevant certificate set or the missing certificate set, so as to obtain the filtered irrelevant certificate set or missing certificate set. The above set serves as the input for training of the model in the next round. For the certificate data in the missing certificate set that cannot subjected to fault attribution by using the above rule, the fault analysis module further performs black-box testing to locate the fault in the certificate monitor. During the stage of the module, any improper behavior of the certificate monitor caused by design or implementation defects will be detected.

For the set of random to-be-queried domain names, the reliability detection method and system for the certificate monitor service in the PKI CT system provided in the present disclosure are used for requesting the domain name certificate query service one by one by utilizing the API provided by each certificate monitor through pre-collecting and analyzing the query strategy of each certificate monitor. Formatting is first performed on the raw output returned by each certificate monitor, and then the search result set is filtered according to the corresponding certificate processing rule. Then, the processed search result sets are aggregated to generate a complete certificate reference set. Based on the difference between the filtered search result set of each certificate monitor and the reference set, the inconsistent domain name set, as well as the irrelevant certificate set and the missing certificate set corresponding to each domain name in the inconsistent domain name set, are output for each certificate monitor. Finally, the fault analysis method is used for performing feature extraction, classification and filtration on the inconsistent certificates in the above set, so that possible faults of the certificate monitor may be located efficiently. The technical solution of the present disclosure may improve the reliability of the PKI CT service.

The above-mentioned method provided in the present disclosure will be further described below in combination with another embodiment.

The present disclosure provides a third-party reliability detection method for a certificate monitor service in a PKI CT system. For a randomly generated group of to-be-queried domain names, the present disclosure continuously collects certificates from a plurality of certificate monitor service providers based on an automated certificate collection tool. The above search result sets collected from each certificate monitor are filtered through the certificate processing rule to remove the irrelevant certificates, and finally the above search result sets are aggregated to generate a complete certificate reference set. Furthermore, the reference set and the search result set from a single certificate monitor are compared to discover the difference between the two. The certificate monitoring service quality of the certificate monitor may be determined, such as missing certificates, returning irrelevant certificates, etc., in order to timely issue an alert to the current certificate monitor service and improve the reliability of the PKI CT service.

For the above-mentioned input random domain names, the certificate collection process includes: first, analyzing, measuring, and extracting the domain name query strategy of the to-be-detected certificate monitor service provider, wherein the domain name query strategy includes the list of log servers monitored by the certificate monitor, supported query methods, returned certificate basic information fields, a quantity limit of the returned results, and the like; second, loading the to-be-queried domain name, and filtering the effective top level domain by using the public suffix list; afterwards, for an input domain name, creating a certificate query task of the domain name for each certificate monitor; specifically, if the to-be-queried domain includes a plurality of domain names, multithreading or other methods may be used to improve the efficiency of certificate search and the synchronization of search; finally, the raw output of the query results of each certificate monitor is formatted to generate a search result set with a unified format.

The above-mentioned certificate search result set includes: (1) observable information, including information from the certificate such as subject information extracted from the certificate, domain name information contained in an SAN extension, certificate serial number, SHA-256 fingerprint, issuer, certificate validity period, and log server information; (2) processable information, including the queried domain name, the matched domain name in the returned certificate results, and the storage format of the certificate in the log server.

For the output search result set of each certificate monitor, the certificate processing rule mainly includes: first, removing irrelevant certificates, wherein the irrelevant certificates include extra certificates in the search result set caused by the erroneous handling of certificates by the certificate monitor per se, misinterpretation of certificate monitor query policies by the operator per se, such as certificates returned that do not match the queried domain name, certificates that have expired during search, certificates that are only recorded in the returned results of a few certificate monitors (threshold can be customized); second, adding the above-mentioned removed certificates to the irrelevant certificate set. The above-mentioned search result sets filtered by the predefined certificate filtering rules are aggregated to obtain the certificate reference set. By comparing the certificate search result set of a single certificate monitor and the certificate reference set, the missing certificates in the certificate monitor search results are obtained and added to the missing certificate set. The missing certificate set includes certificates that are not returned in the returned search results due to reasons such as the certificate monitor hiding certificates issued by the certificate authority for the to-be-queried domain name, certificate monitor software fault, certificate monitor implementation fault, etc.

The irrelevant certificate set or the missing certificate set at least includes the following information: query domain name, SHA-256 fingerprint, serial number, certificate validity period, certificate issuer, certificate subject, log servers to which the certificate is submitted, target domain name, the storage format of the certificate in the log server, etc.

The inconsistent domain name set at least includes the following information: query domain name, query time, the number of certificates in the reference set, the number of certificates in the irrelevant certificate set corresponding to the domain name, the number of certificates in the missing certificate set corresponding to the domain name, etc.

In order to further analyze the reasons for the difference between the certificate results returned by the certificate monitor and the reference set and locate potential faults, the method includes: first, constructing an automated feature extraction tool, and training the model by using the irrelevant certificate set and missing certificate set corresponding to each domain name in the inconsistent domain name set as model inputs; second, referring to the feature ranking output by the automation tool, outputting a result for guiding the generation of a table of fault causes each of which may induce a fault of the certificate monitor; finally, filtering the certificates in the irrelevant certificate set or missing certificate set based on the above-mentioned table of fault causes; for missing certificates that cannot match the above-mentioned table of fault causes, further performing a black-box testing to locate the faults in the certificate monitor. The black-box testing method includes searching based on the SHA-256 fingerprint of the certificate or the target domain names matched by the certificate, and other methods.

For the formulation of the table of fault causes, the reference content at least further includes log server attributes (such as the organization operating the log server, the growth rate of records, etc.), the format information of the certificate in the log server, target domains that the certificate matches and the number of the target domains, a validity period of the certificate, and the number of certificates originally output.

According to another embodiment of the present disclosure, the above-mentioned third-party reliability detection system for a certificate monitor service in a PKI CT system includes a certificate collection module, a difference detection module, and a fault analysis module.

The certificate collection module is applied to the certificate collection of random domain name. Specifically, a to-be-queried domain name is randomly input, and a separate task scheduler and a separate certificate crawler are assigned to each to-be-queried domain name based on query strategies of each certificate monitor that have been measured, analyzed, and extracted. Then, the certificate query results returned by each certificate monitor are formatted to generate a search result set with a uniform format. Specifically, the certificate monitors used by the module may be added or subtracted according to actual needs.

The difference detection module is applied to the difference detection of the results returned by different certificate monitors. Specifically, the search result sets generated by different certificate monitors are processed according to the certificate processing rule, so as to generate a reference set that may reflect certificate data in a real scene. Then, the inconsistent certificate that exist in the certificate monitor may be identified by comparing a single filtered search result set with a reference set that reflects the complete certificate data.

The fault analysis module is applied to the fault analysis of the certificate monitor. Specifically, based on the irrelevant certificate set and missing certificate set corresponding to each query domain name in the existing inconsistent domain name set, the automated feature extraction tool is used to extract the features of inconsistent certificates from the above sets. The output feature ranking may be used to guide the generation of a table of fault causes each of which may induce a fault of the certificate monitor. Then, statistical or other scientific methods are used to analyze and optimize the above-mentioned rule set, and the rule set is applied to the filtering of the irrelevant certificate set and the missing certificate set. For certificates in the missing certificate set that cannot match the above-mentioned table of fault causes, black-box testing will be further performed to locate the fault in the certificate monitor. The module may detect improper behavior of the certificate monitor caused by design or implementation defects. Meanwhile, the fault analysis module may analyze and locate potential problems and causes in the certificate monitoring and query services of each certificate monitor, may issue timely alerts to the certificate monitor service provider, and may provide improvement suggestions and measures to the certificate monitor service provider in combination with the query strategies and the features of the query result dataset, so as to improve service reliability.

The specific embodiments described above further explain objectives, technical solutions and beneficial effects of the present disclosure in detail. It should be understood that the specific embodiments described above are only specific embodiments of the present disclosure, and should not be used to limit the present disclosure. Any modifications, equivalent substitutions, improvements and the like made within the spirit and principle of the present disclosure should be included in the protection scope of the present disclosure.

What is claimed is:

1. A reliability detection method for a certificate monitor service in a PKI certificate transparency system, comprising:
    sending a randomly generated set of to-be-queried domain names to a plurality of third-party certificate monitor service providers, and processing collected raw certificates output by the plurality of third-party certificate monitor service providers to obtain a plurality of certificate search result sets;
    for each queried domain name, filtering and aggregating the plurality of certificate search result sets to obtain a certificate reference set, detecting a difference between each certificate search result set and the certificate reference set, and issuing a reliability alert to the third-party certificate monitor service provider in a case that there is an irrelevant certificate and/or a missing certificate in the certificate search result set; and
    extracting features from a result of the filtering and a result of the detecting the difference by using a feature extraction tool, analyzing the extracted features, generating, based on a result of the analyzing, a table of fault causes each of which induces a fault of the third-party certificate monitor service provider, and locating the fault of the third-party certificate monitor service provider according to the result of the filtering, the result of the detecting the difference, and the table of fault causes.

2. The method according to claim 1, wherein the sending a randomly generated set of to-be-queried domain names to a plurality of third-party certificate monitor service providers, and processing collected raw certificates output by the plurality of third-party certificate monitor service providers to obtain a plurality of certificate search result sets comprises:

generating certificate query requests for each third-party certificate monitor service provider according to a certificate query rule of each third-party certificate monitor service provider, wherein the certificate query request meets a corresponding certificate query requirement and conforms to a query strategy of the third-party certificate monitor service provider;

sending, according to each certificate query request, the set of to-be-queried domain names to the third-party certificate monitor service provider corresponding to the certificate query request through a query interface provided by each third-party certificate monitor service provider;

outputting, in response to each certificate query request, the raw certificate through the third-party certificate monitor service provider corresponding to the certificate query request; and formatting each raw certificate according to a predefined certificate formatting rule to obtain the plurality of certificate search result sets.

3. The method according to claim 2, wherein the certificate query rule comprises a query method supported by the third-party certificate monitor service provider;

wherein the certificate formatting rule comprises generating, for each certificate, a unified output information and a unique certificate identifier; and wherein for each certificate, the certificate identifier is constructed based on a serial number, an issuer, and a validity period of the certificate.

4. The method according to claim 1, wherein the filtering and aggregating the plurality of certificate search result sets to obtain a certificate reference set, detecting a difference between each certificate search result set and the certificate reference set, and issuing a reliability alert to the third-party certificate monitor service provider in a case that there is an irrelevant certificate and/or a missing certificate in the certificate search result set comprises:

performing irrelevant certificate filtering on each certificate search result set according to a predefined certificate filtering rule, and in a case that there is the irrelevant certificate in the certificate search result set, adding the irrelevant certificate to an irrelevant certificate set corresponding to the third-party certificate monitor service provider, and issuing the reliability alert to the third-party certificate monitor service provider;

aggregating each filtered certificate search result set to obtain the certificate reference set, detecting a difference between the certificate reference set and each filtered certificate search result set, and in a case that there is the missing certificate in the result of the detecting the difference, adding the missing certificate to a missing certificate set corresponding to the third-party certificate monitor service provider, and issuing the reliability alert to the third-party certificate monitor service provider; and extracting a query domain name corresponding to each certificate in the irrelevant certificate set and the missing certificate set of each third-party certificate monitor service provider, so as to generate an inconsistent domain name set for each third-party certificate monitor service provider.

5. The method according to claim 4, wherein the irrelevant certificate comprises a certificate that is erroneously processed due to implementation and design defects by the third-party certificate monitor service provider, wherein an information of each certificate in the irrelevant certificate set and the missing certificate set comprises a query domain name, an SHA-256 fingerprint, a serial number, a certificate validity period, a certificate issuer, a certificate subject, log servers to which the certificate is submitted, a target domain name, and a storage format of the certificate in the log server; and wherein an information of each domain name in the inconsistent domain name set comprises a query domain name, a query time, a number of certificates in the reference set, a number of certificates in the irrelevant certificate set corresponding to the domain name, and a number of certificates in the missing certificate set corresponding to the domain name.

6. The method according to claim 1, wherein the extracting features from a result of the filtering and a result of the detecting the difference by using a feature extraction tool, analyzing the extracted features, generating, based on a result of the analyzing, a table of fault causes each of which induces a fault of the third-party certificate monitor service provider, and locating the fault of the third-party certificate monitor service provider according to the result of the filtering, the result of the detecting the difference, and the table of fault causes comprises:

constructing the feature extraction tool based on a machine learning technology and/or a statistical learning method, and extracting features from each result of the filtering and each result of the detecting the difference by using the feature extraction tool, so as to obtain a feature set of each third-party certificate monitor service provider;

analyzing each feature set to obtain the result of the analyzing corresponding to the third-party certificate monitor service provider;

generating, according to each result of the analyzing, the table of fault causes for each third-party certificate monitor service provider; and locating the fault of the third-party certificate monitor service provider according to the result of the filtering, the result of the detecting the difference, and the table of fault causes.

7. The method according to claim 1, wherein a reference of the table of fault causes comprises a log server attribute information of the third-party certificate monitor service provider, a format information of the certificate in a log server, a target domain name matched by the certificate and a number of the target domain names, a certificate validity period, and a quantity information of the raw certificate set.

8. The method according to claim 7, wherein the locating the fault further comprises locating the fault occurring during an internal working process by using a black-box testing method;

wherein a judgment basis for the black-box testing comprises a search result based on an SHA-256 certificate fingerprint and/or a search result based on the target domain name matched by the certificate;

in a case that the search result based on the SHA-256 certificate fingerprint is that a corresponding certificate is not found, it is determined that the fault of the third-party certificate monitor service provider occurs in a certificate fetch stage or a certificate storage stage;

in a case that the search result based on the target domain name matched by the certificate is that a corresponding certificate is not found, it is determined that the fault of the third-party certificate monitor service provider occurs in a certificate query stage or a certificate result return stage.

9. The method according to claim 1, wherein an information of each certificate element in the certificate search result set comprises a subject information extracted from the certificate, a domain name information contained in a Subject Alternative Name (SAN) extension, a certificate serial number, an SHA-256 fingerprint, an issuer, a certificate validity period, a log server information, a query domain name, a target domain name matched by the certificate in the raw certificate set, and a storage format of the certificate in the log server.

\* \* \* \* \*